United States Patent [19]

Kudo et al.

[11] Patent Number: 5,077,751

[45] Date of Patent: Dec. 31, 1991

[54] DIODE LASER PUMPED SOLID STATE LASER

[75] Inventors: Shuetsu Kudo; Shuichi Watanabe, both of Tokyo, Japan

[73] Assignee: NEC Corporation, Japan

[21] Appl. No.: 372,778

[22] Filed: Jun. 29, 1989

[30] Foreign Application Priority Data

Jun. 30, 1988 [JP] Japan ............................. 63-85715[U]

[51] Int. Cl.$^5$ .......................... H01S 3/091; H01S 3/094
[52] U.S. Cl. .......................................... 372/75; 372/68
[58] Field of Search ........................ 372/71, 75, 68, 93

[56] References Cited

U.S. PATENT DOCUMENTS

| | | | |
|---|---|---|---|
| 3,753,147 | 8/1973 | Schultess | 372/68 |
| 3,890,578 | 6/1975 | Wang | 372/75 |
| 4,173,001 | 10/1979 | Koepf | 372/71 |
| 4,794,615 | 12/1988 | Berger et al. | 372/71 |

Primary Examiner—William L. Sikes
Assistant Examiner—Robert E. Wise
Attorney, Agent, or Firm—Leydig, Voit & Mayer

[57] ABSTRACT

A pumped laser arrangement comprises a pumping laser and at least first and second laser elements positioned such that their axes intersect at a predetermined angle. A mirror which transmits light emitted by the pumping laser and reflects light emitted by the laser elements is positioned at the intersection of the axes to reflect light between the ends of the first and second laser elements. The pumping laser is optically coupled through the mirror to the end of one of the first and second laser elements.

21 Claims, 3 Drawing Sheets

DIODE LASER PUMPED SOLID STATE LASER

BACKGROUND OF THE INVENTION

This invention relates to an improvement in a solid state laser which is pumped by a diode laser (semiconductor laser).

Typical of diode laser pumped solid state lasers known in the art is an Nd:YAG (Neodymium Doped Yttrium Aluminum Garnet) laser. The diode laser pumped Nd:YAG lasers are generally classified into two types, i.e., a side pumped type laser and an end pumped type laser as disclosed in U.S. Pat. Nos. 4,575,854 and 3,982,201, respectively. A side pumped type laser has a diode laser array to for illuminating the side of an Nd:YAG laser rod thereby supplying pumping power to the laser rod, while an end pumped type laser introduces light from a diode laser into the end of an Nd:YAG laser rod for supplying the latter with pumping power. The end pumped type laser is advantageous over the side pumped type laser because it allows the laser rod to absorb the pumping light efficiently and has a high lasing efficiency.

A problem with the end pumped type laser, however, is that the pumping light which can be incident into the laser rod is limited. Specifically, since the pumping light can be introduced into the laser rod only at the opposite ends of the laser rod where a pair of resonance mirrors are disposed, the number of diode laser usable for pumping purpose is limited. It follows that the output power of Nd:YAG laser cannot be increased unless the output of the individual diode laser is increased. For this reason, an increase in the laser output power is difficult to achieve.

SUMMARY OF THE INVENTION

It is therefore an object of the present invention to provide an end pumped type laser which allows pumping light from diode lasers to be introduced therein at a number of points between resonance mirrors.

It is another object of the present invention to provide an end pumped type lases which readily laser with a high output.

In accordance with the present invention, a diode laser pumped solid state laser is constructed such that a pumping light issuing from a diode laser is incident to the ends of two or more solid state laser elements thereby causing lasing between a pair of laser resonators. All the solid state laser elements are disposed between the laser resonance mirrors such that the nearby solid state laser elements have optical axes extensions which intersect each other at a single point at a predetermined angle. Diode lasers individually produce pumping lights which are directed toward the ends of the individual solid state laser elements to be absorbed by the solid state laser elements. Mirror means is located at the point where the extensions of the optical axes of the nearby solid state elements intersect, for highly transmitting the pumping lights from the diode laser and for totally reflecting for lasing lights from the solid state laser elements. The pumping lights are passed through the mirror means to illuminate the ends of the nearby solid state laser elements. The lasing light is reflected by the mirror means to travel back and forth between the laser resonance mirrors, while a part of the lasing light is outputted from one of the laser resonance mirrors.

BRIEF DESCRIPTION OF THE DRAWINGS

The present invention will be better understood from the following detailed description taken in conjunction with the accompanying, drawings in which.

DETAILED DESCRIPTION OF THE PREFERRED EMBODIMENTS

Figure 1:
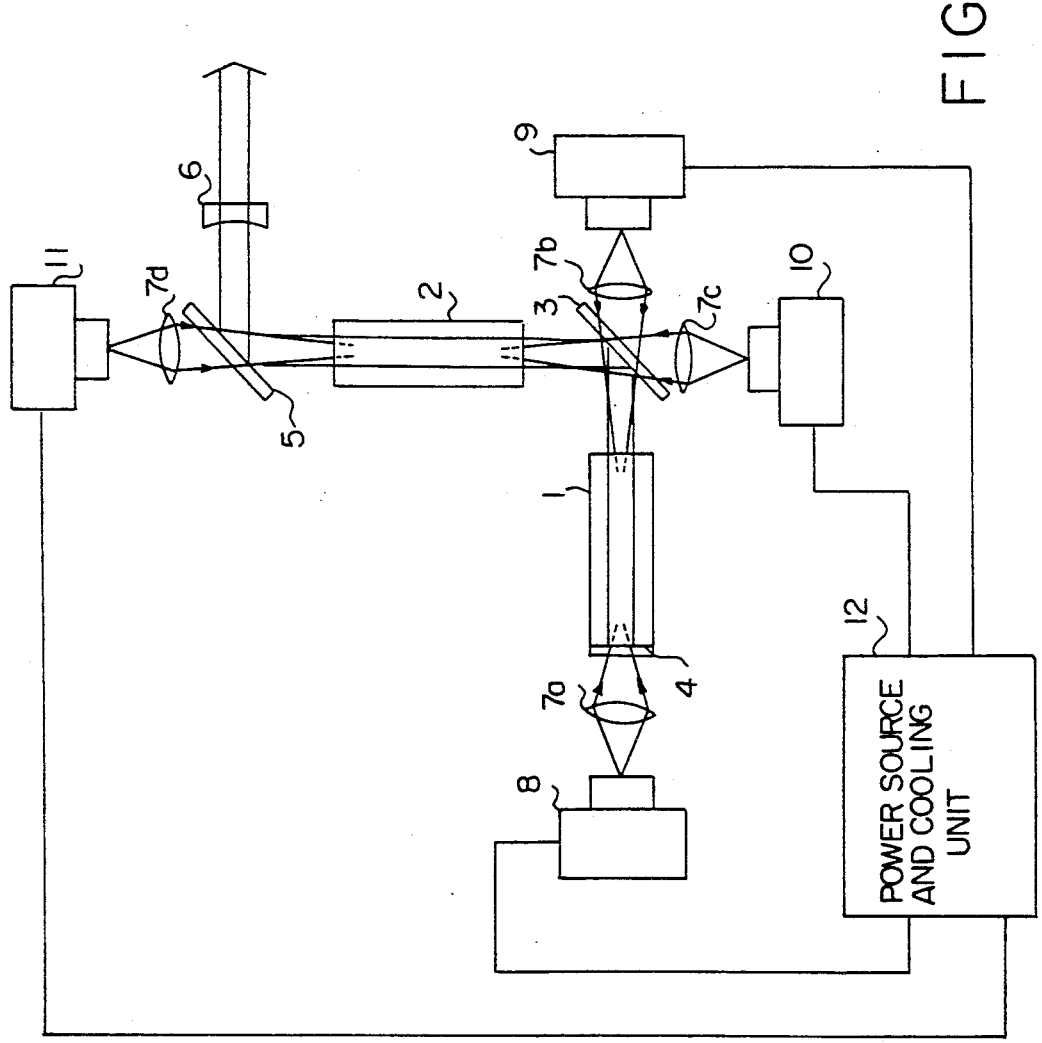
FIG. 1 is a plan view showing one embodiment of the diode laser pumped solid state laser in accordance with the present invention.

Referring to FIG. 1 of the drawings, an end pumped type laser embodying the present invention comprises a first and a second Nd:YAG laser rods 1 and 2 as main laser materials. Diode lasers 8, 9, 10 and 11 issue pumping lights which are individually incident to the opposite ends of each of the laser rods 1 and 2, i.e. four ends in total.

Extensions of the optical axes of the Nd:YAG laser rods 1 and 2 intersect each other at a single point at an angle of 90 degrees. A dichroic mirror 3 is located at the junction of the optical axes. The dichroic mirror 3 is coated with a dielectric multilayer film which is highly transmissive for the pumping lights from the diode lasers 9 and 10 and totally reflective for Nd:YAG lasing lights. The dichroic mirror 3 is inclined 45 degrees relative to the optical axes of the laser rods 1 and 2. Laser, resonance mirrors arc implemented as a total reflection mirror 4 which is coated on the end of the first Nd:YAG laser rod 1 remote from the mirror 3, and an output mirror 6 to which laser light issuing from the end of the second Nd:YAG laser rod 2 remote from the mirror 3 is incident. The total reflection mirror 4 transmits most of the pumping light issuing from the diode laser 8, while reflecting totally the Nd:YAG laser lights. The output mirror 6 transmits a part of the Nd:YAG light from the Nd:YAG laser rod 2. A dichroic mirror 5 is disposed between the output mirror 6 and the end of the Nd:YAG laser rod 2 and is inclined 45 degrees relative to the optical axis of the Nd:YAG laser rod 2. The dichroic mirror 5 is coated with a dielectric multilayer film which is highly transmissive for the pumping light from the diode laser 11 and totally reflective to the Nd:YAG laser light whose wavelength is 1.06 $\mu$m.

In the above construction, the Nd:YAG laser light travels back and forth between the total reflection mirror 4 and the output mirror 6 by way of the dichroic mirrors 3 and 5.

Condensing lenses 7a and 7b focus respectively the pumping lights issuing from the diode lasers 8 and 9 so as to supply the Nd:YAG laser rod 1 with pumping power necessary for lasing. Likewise, condensing lenses 7c and 7d focus respectively the pumping lights emitting from the diode lasers 10 and 11 to supply the Nd:YAG laser rod 2 with pumping power necessary for lasing. In the illustrative embodiment, four laser rod ends for receiving pumping light are available between the laser resonance mirrors 4 and 6, feeding greater pumping power to the laser rods located between the resonators.

A power source and cooling unit 12 has a power source for driving the diode lasers 8, 9, 10 and 11, and circuity for generating signals for cooling the individual diode lasers. More specifically, the diode lasers are each cooled by a Peltier element, and the unit 12 controls the temperature of the diode lasers by controlling the current which flows through the Peltier elements.

To increase the efficiency of the diode laser pumped Nd:YAG laser shown in FIG. 1, it is important that the lasing wavelength of the diode lasers 8, 9, 10 and 11 be well matched to the absorption wavelength of the Nd:YAG laser rods 1 and 2. In the light of this, a series of experiments were conducted to determine the absorption characteristic of an Nd:YAG laser rod. It was found that an Nd:YAG laser rod shows an absorption peak to lights whose frequency is around 809 nanometers. Preferably, therefore, the diode lasers 8 to 11 should have a lasing wavelength of 809 nanometers. When a light beam with that wavelength strikes as a pumping beam the end of the Nd:YAG rod having a length of 5 mm, about 96 percent of the pump light is absorbed by the rod in the axial direction.

Another factor influencing on the Nd:YAG laser efficiency is the positions where the pumping lights from the individual diode laser are focused onto the Nd:YAG laser rods. The positions should be determined by factors such as pumping light absorption coefficient of the rod, spot diameter of the pumping light, and incidence angle of the pumping light with respect to the rod.

The axis of the pumping light should be set coincident with that of the Nd:YAG lasing light.

Figure 2:
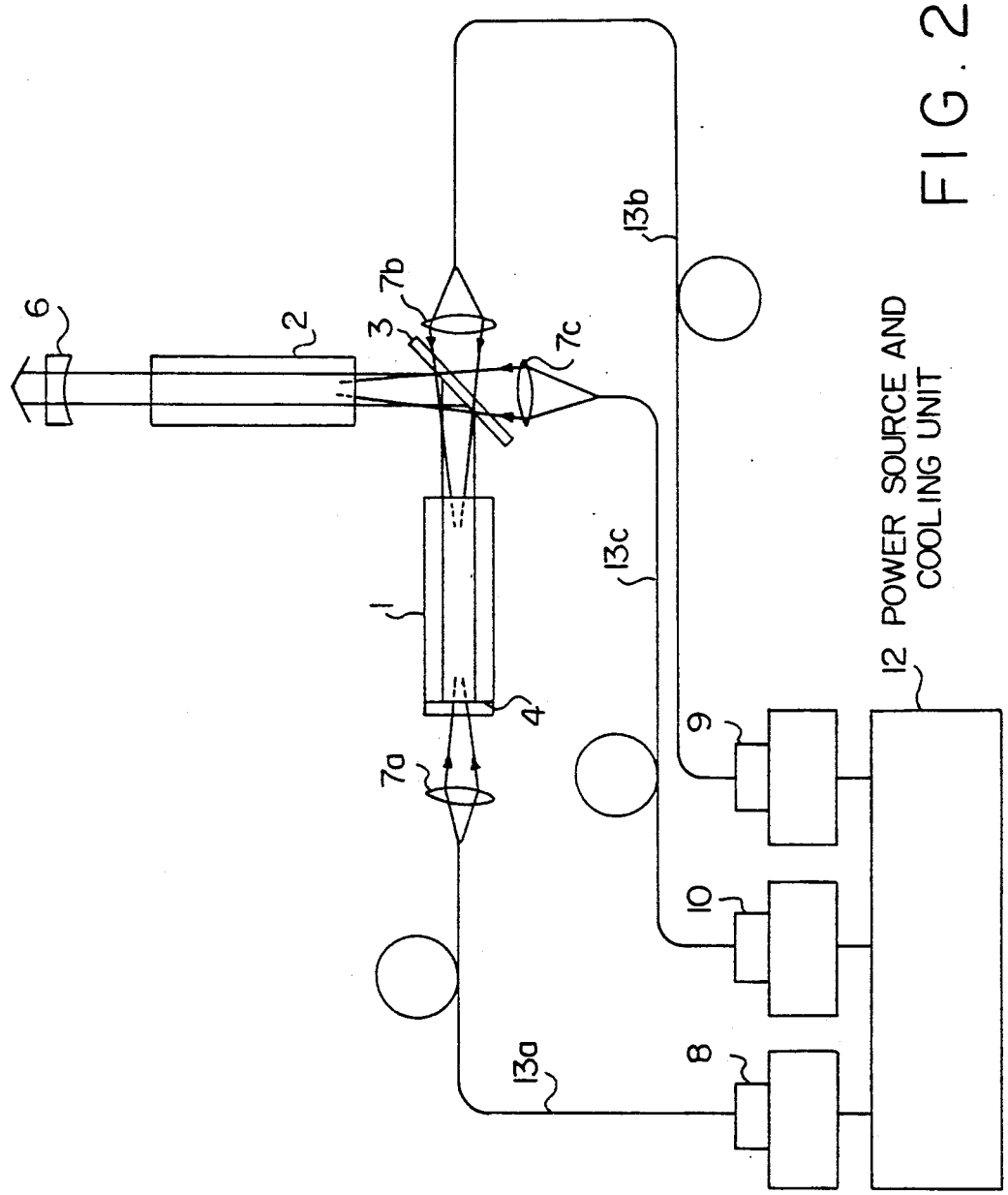
FIG. 2 is a plan view showing an alternative embodiment of the present invention.

Referring to FIG. 2, an alternative embodiment of the present invention is shown. In the figures, similar components and structural elements are designated by the same reference numerals, and redundant description will be avoided for simplicity. The alternative embodiment differs from the embodiment of FIG. 1 in that it does not introduce the pumping light from the output mirror 6 in the second Nd:YAG laser rod 2, and in that optical fibers 13a, 13b and 13c interconnect the diode lasers 8, 9 and 10 and the lenses 7a, 7b and 7c, respectively. Pumping light from the diode lasers 8, 9 and 10 are propagated through the optical fibers 13a, 13b and 13c, respectively. The light coming out of the optical fibers 13a and 13b are 7b, respectively. The light coming out of the optical fiber 13c is focused with the lens 7c onto the Nd:YAG laser rod 2.

An advantage attainable with this particular embodiment is that the diode lasers 8, 9 and 10 can be located at any desired positions remote from the Nd:YAG lasing section. This allows the diode lasers 8, 9 and 10 to be cooled collectively and allows them to be constructed into a laser diode array.

Figure 3:
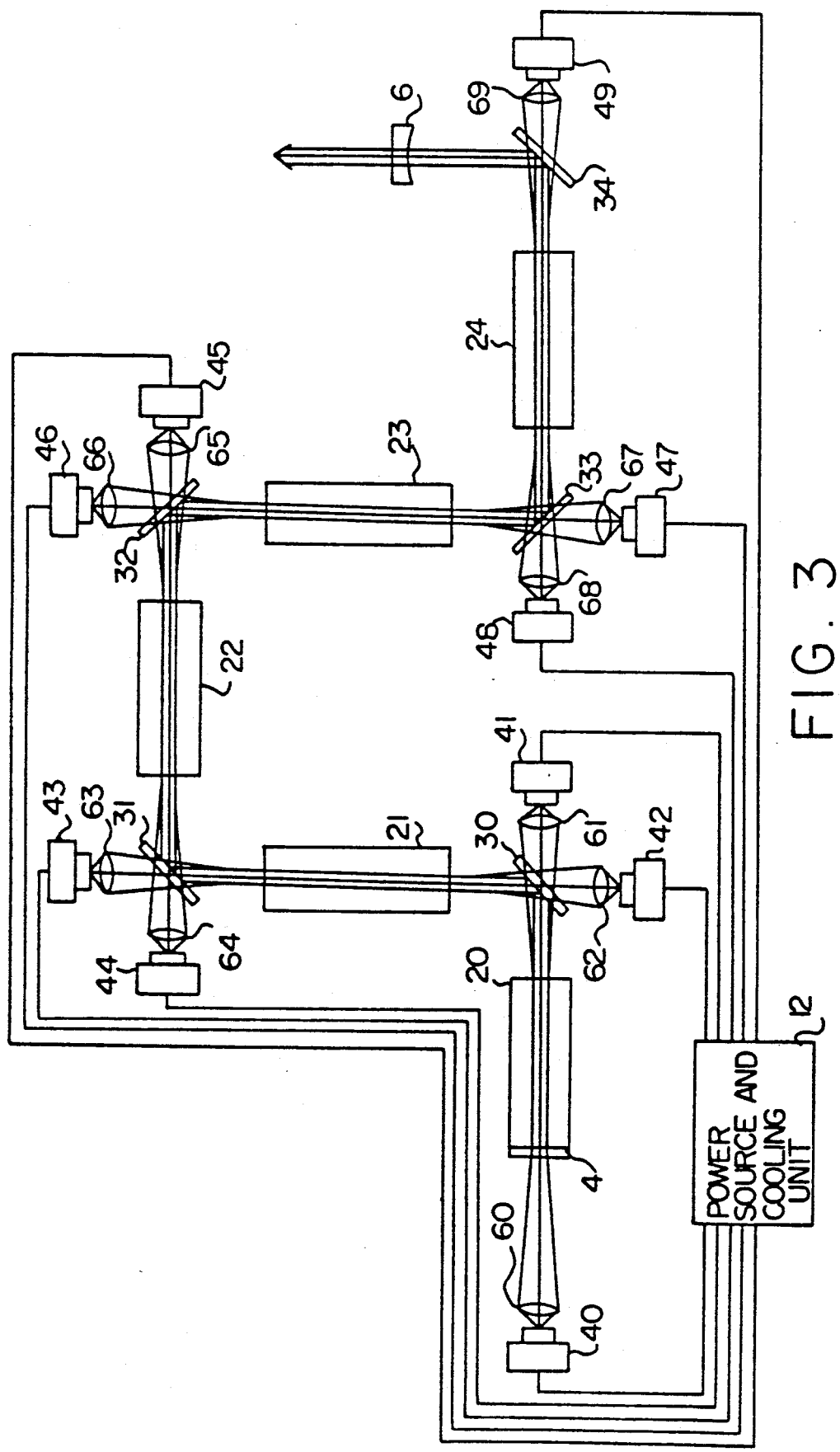
FIG. 3 is a plan view showing another alternative embodiment of the present invention.

Referring to FIG. 3, another alternative embodiment of the present invention is shown. In this embodiment, five Nd:YAG laser rods 20, 21, 22, 23 and 24 and five dichroic mirrors 30, 31, 32, 33 and 34 are arranged between the resonance mirrors 4 and 6 in order to increase the output of the end pumped type Nd:YAG laser shown in FIG. 1. Each of the dichroic mirrors 30 to 34 is located at a point where the extensions of optical axes of nearby laser rods intersect each other, while being inclined such that the optical axes of lasing lights incident to and reflected from the mirror coincide with those of the two laser rods. The dichronic mirrors 30 to 34 function in the same manner as the dichroic mirror 3 of FIG. 1.

Pumping lights having the same wavelength are incident to opposite ends of the laser rods 20, 21, 22, 23 and 24. The laser rods 20, 21, 22, 23 and 24 absorb respectively the pumping light from the diode lasers 40 and 41, the pumping light from the diode lasers 42 and 43, the pumping light from the diode lasers 44 and 45, the pumping light from the diode lasers 46 and 47, and the pumping light from the diode lasers 48 and 49. Condensing lenses 60 to 69 are so located as to introduce the pumping lights from their associated diode lasers to the ends of the Nd:YAG laser rods.

The Nd:YAG lasing light travels back and forth along the optical path between the resonance mirrors 4 and 6 by way of the highly pumped laser rods 20 to 24, so that the output mirror 6 emits laser light having high output energy.

That the angle of 90 degrees at which the optical axes of nearby laser rods intersect as shown in FIGS. 1, 2 and 3 is not a prerequisite. It is a prerequisite, however, that each dichroic mirror intervening between nearby laser rods be inclined such that the optical axes incident thereto and reflected therefrom coincide with those of the two laser rods. Each laser rod may be provided with curved ends to prevent laser light emitting therefrom from spreading. The Nd:YAG laser rods shown and described as implementing main laser elements may be replaced with another solid state laser element, if desired.

In summary, in accordance with the present invention, a diode laser pumped solid state laser comprises, between a pair of laser resonators, a plurality of solid state laser elements which are arranged such that the optical axes of nearby laser elements intersect each other. Mirror means is located at the junction of the extensions of optical axes of nearby laser elements and has a coating thereon which is highly transmissive for pumping lights from diode lasers and totally reflective for solid state laser lights. The individual solid state laser elements are capable of being end pumped by the diode lasers. This kind of construction allows solid state laser elements and diode lasers to be arranged in a desired number of stages between the pair of laser resonators, resulting in an increase solid state laser output.

What is claimed is:

1. A diode laser pumped solid state laser in which a light emitting from a diode laser is incident to an end of a solid state laser element to pump said laser element for thereby causing lasing between laser resonators, comprising:

a pair of laser resonance mirrors;

solid state laser elements disposed between said laser resonance mirrors such that nearby ones of said solid state laser elements have optical axes extensions of which intersect each other at a single point at a predetermined angle;

diode lasers for individually producing pumping lights which are directed toward ends of said individual solid state laser elements to be absorbed by said solid state laser elements; and mirror means, located at the point where the extensions of the optical axes of said nearby solid state elements intersect for highly transmitting the pumping lights from said diode lasers and for totally reflecting lasing lights from said solid state laser elements;

the pumping lights being passed through said mirror means to illuminate the ends of said nearby solid state laser elements, the lasing light being reflected by said mirror means to travel back and forth between said laser resonance mirrors while a part of said lasing light is outputted from one of said laser resonance mirrors.

2. A diode laser pumped solid state laser as claimed in claim 1, wherein said solid state laser elements comprise Nd:YAG laser rods.

3. A diode laser pumped solid state laser as claimed in claim 1, wherein one of said laser resonance mirrors comprises a film which is directly coated on the end of said solid state laser element.

4. A diode laser pumped solid state laser as claimed in claim 3, further comprising condensing lenses for focusing the pumping lights incident to the ends of said solid state laser elements to a point of predetermined length of each of said solid state laser elements as measured from the end.

5. A diode laser pumped solid state laser as claimed in claim 1, further comprising condensing lenses for focusing the pumping lights incident to the ends of said solid state laser elements to a point of predetermined length of each of said solid state laser elements as measured from the end.

6. A diode laser pumped solid state laser as claimed in claim 1, further comprising optical fibers to which the pumping lights from the diode lasers are individually incident, lights emanating from said optical fibers being incident to the ends of said individual solid state elements.

7. An arrangement comprising:
at least first and second laser elements, each having an end and an axis extending through the end, the first and second laser element being positioned such that the axes of the first and second laser elements intersect at a predetermined angle;
first and second laser resonance mirrors arranged to oscillate the light emitted by the laser elements, one of the first and second resonance mirrors being partially transmissive of the light emitted by the laser elements;
a pumping laser; and
a mirror which transmits light emitted by the pumping laser and reflects light emitted by the laser elements, the mirror being positioned at the intersection of the axes of the first and second laser elements to reflect light between the ends of the first and second laser elements and a pumping laser being optically coupled through the mirror to the end of one of the first and second laser elements.

8. The arrangement as claimed in claim 7 wherein the laser elements include solid state laser elements.

9. The arrangement as claimed in claim 8 wherein the solid state laser elements include Nd:YAG laser rods.

10. The arrangement as claimed in claim 7 wherein one of the first and second laser resonance mirrors comprises a film which is directly coated on an end of the first laser element.

11. The arrangement as claimed in claim 10 further comprising a second pumping laser, wherein the film transmits the light emitted by the second pumping laser and reflects the light emitted by the laser element.

12. The arrangement as claimed in claim 7 further comprising a condensing lens for focusing the light emitted by the pumping laser.

13. The arrangement as claimed in claim 7 wherein the pumping laser includes a diode laser.

14. The arrangement as claimed in claim 13 wherein the diode laser comprises a Peltier element.

15. The arrangement as claimed in claim 13 further comprising at least a second pumping laser, the first and second pumping lasers each including a diode laser and each being optically coupled through the mirror to the end of the first and second laser elements respectively.

16. The arrangement as claimed in claim 15 wherein each pumping laser further includes a Peltier element and where the arrangement further comprises a single power source and cooling unit electrically connected to the first and second diode lasers and Peltier elements, the unit including circuitry for controlling the current delivered to the Peltier elements for cooling the diode lasers.

17. The arrangement as claimed in claim 15 further comprising at least first and second optical fibers each having first and second ends, the first end of the first optical fiber being optically coupled to the first diode laser, the first end of the second optical fiber being optically coupled to the second diode laser, and the second end of the first and second optical fibers being optically coupled to the end of the first and second laser elements respectively.

18. The arrangement as claimed in claim 7 further comprising an optical fiber having first and second ends, the first end of the optical fiber being optically coupled to the pumping laser and the second end of the optical fiber being optically coupled to the end of one of the first and second laser elements.

19. The arrangement of claim 7 wherein the pumping laser comprises a first pumping laser and the arrangement further includes a second pumping laser and wherein the first pumping laser is optically coupled through the mirror to the end of one of the first and second laser elements and the second pumping laser is optically coupled to the other laser element.

20. The arrangement of claim 19 wherein the second pumping laser is optically coupled through the mirror to the end of the other laser element.

21. A diode laser pumped solid state laser comprising:
a pair of laser resonance mirrors;
a plurality of solid state laser elements, each having an end, the solid state laser elements being optically disposed between the laser resonance mirrors;
a plurality of diode lasers disposed such that pumping lights emitted from the diode lasers are directed toward the ends of the solid state laser elements; and
mirrors which are transmissive of the pumping lights emitted from the diode laser and reflective of the laser light emitted from the solid state laser elements, the mirrors being positioned between the solid state laser element to reflect light emitted by the solid state laser elements between the ends of adjacent solid state laser elements and to transmit light emitted by the diode lasers into the ends of the solid state laser elements.

* * * * *

UNITED STATES PATENT AND TRADEMARK OFFICE
CERTIFICATE OF CORRECTION

PATENT NO. : 5,077,751
DATED : December 31, 1991
INVENTOR(S) : Kudo et al.

It is certified that error appears in the above-identified patent and that said Letters Patent is hereby corrected as shown below:

Claim 1, column 4, line 47, change "solid" to --at least two solid--.

Claim 7, column 5, lien 29, change "element" to --elements--.

Signed and Sealed this

Sixth Day of July, 1993

Attest:

MICHAEL K. KIRK

*Attesting Officer*     *Acting Commissioner of Patents and Trademarks*